INVENTOR.
PERCIVAL C. KEITH
BY
ATTORNEY

United States Patent Office 3,442,332
Patented May 6, 1969

3,442,332
COMBINATION METHODS INVOLVING THE MAKING OF GASEOUS CARBON DIOXIDE AND ITS USE IN CRUDE OIL RECOVERY
Percival C. Keith, Hub Hollow Road,
Peapack, N.J. 07977
Filed Feb. 1, 1966, Ser. No. 524,079
Int. Cl. E21b 43/16, 43/00, 43/24
U.S. Cl. 166—266
10 Claims

ABSTRACT OF THE DISCLOSURE

Substantially pure gaseous carbon dioxide which is desirably produced in processing a hydrocarbon feed is injected into an underground formation containing crude oil at a pressure not exceeding the formation overburden pressure with about 1800 p.s.i. as the maximum partial pressure of the injected carbon dioxide. Thus, carbon dioxide dissolves in the oil and reduces its viscosity. The solution of reduced viscosity is withdrawn from the formation and the oil is recovered by separating therefrom carbon dioxide which may be again injected into the formation. Carbon dioxide at the desired injection pressure may be bubbled through heated water prior to injection into the formation.

---

My invention pertains to recovery of crude oil, particularly secondary recovery, using gaseous carbon dioxide; a combination process using gaseous carbon dioxide, for secondary recovery, which $CO_2$ is obtained in connection with an operation for making ammonia; a combination process using gaseous carbon dioxide for secondary recovery, which $CO_2$ is obtained in connection with the upgrading of the crude oil produced; and a combination process utilizing gaseous carbon dioxide for secondary recovery of crude oil in connection with an ammonia operation and the upgrading of the crude oil produced.

A recent U.S. survey indicates that while as much as 10 billion barrels of heavy oil, below about 25° API, have already been produced, the heavy oil reservoirs in the United States contain over 150 billion barrels of oil still in place.

Heavy oils are being relied upon and will be relied upon to a much greater extent in the future to produce a substantial part of the petroleum needs of this country. These low gravity oils are notably difficult to produce by secondary recovery and several methods are being used, of which the most important are as follows:

(1) *Fire-flood method.*—This technique uses air injection into the formation to advance a zone of combustion with associated high temperature from an injection well to adjacent production wells. This process has a number of disadvantages, including: it consumes a substantial part of the reservoir oil as fuel; the gases produced are odorous because of the oxides of nitrogen and sulphur; where air pollution is a problem, as in the Los Angeles area, fire-floods have been shut down on orders of municipal governments. Some fire-flood production attempts have been economic failures, but heavy oil is being produced in California by its use.

(2) *Steam injection method.*—This involves the production of large quantities of steam which are injected through one well into the formation, and the high temperature increases the flow of oil which is produced usually in the same well but frequently from an output well.

This method has a number of disadvantages: it cannot be employed successfully unless the thickness of the formation is at least 25 feet; it requires the availability of a large quantity of cheap fuel and, what in many cases is more difficult to obtain, a large supply of good water. A limiting factor is the injection pressure, since up to 2000 p.s.i. steam generator prices are determined by the capacity, but above 2000 p.s.i. prices skyrocket.

(3) *Invert (flue) gas injection method.*—This method involves the injection of inert gas, usually internal combustion engine exhaust, through an input well into the formation to maintain pressure which forces the oil through the formation from the input well to adjacent production wells, or the oil can be produced from the injection well (huff and puff method). Typically the gas has a composition of approximately 11%–15% $CO_2$ and 89%–85% $N_2$.

*Carbon dioxide in crude oil.*—It has been recognized that $CO_2$ has a very high solution factor in crude oils, and the viscosity of crude oil-$CO_2$ solution is markedly lower than that of the crude oil itself. If the pressure is increased to at least about 600 p.s.i., the viscosity is greatly reduced.

Information is available in the literature on the characteristics of solutions of carbon dioxide in crude oil and also the results of secondary recovery work using $CO_2$ in various techniques. Publications of interest are:

"Effect of Dissolved Gas Upon the Viscosity and Surface Tension of Crude Oil," Petr. Trans, AIME, pp. 51–63 (1926);

"Carbon Dioxide Solvent Flooding for Increased Oil Recovery," Petr. Trans, AIME, pp. 225–231 (1959);

"Laboratory Investigation of the Water Driven Carbon Dioxide Process for Oil Recovery," Petr. Trans, AIME, pp. 388–391 (1959);

"Physical Properties of Carbonated Oils," J. Petr. Tech., pp. 873–876 (Aug. 1963);

"A Study of the Vaporization of Crude Oil by Carbon Dioxide Repressuring," J. Petr. Tech., pp. 1247–1252 (1963);

"Use of Carbon Dioxide for Water Injectivity Improvement," J. Petr. Tech., pp. 25–31 (1964);

"A Calculation Method for Carbonated Water Flooding," J. Soc. Petr. Eng., pp. 9–20 (1964);

"Engine Exhaust Gas Boosts Heavy Oil Recovered," Petroleum Engineer, August 1964, pp. 43–47;

"How Newer Recovery Methods are Performing," World Oil, November 1964, pp. 96–104;

"Inert Gas Ups Viscous Oil Production," Petroleum Engineer, August 1965, pp. 76–80.

I believe that because of the marked decrease in viscosity of crude oil when carbon dioxide is dissolved into it in large amounts and the increase in yield of recovered oil resulting from the miscibility of carbon dioxide, in the region of its critical point, generally with light crude oil, the use of carbon dioxide in secondary recovery of crude oil is an attractive operation. However, this operation does require very large quantities of substantially pure carbon dioxide in order to obtain the benefits of both the low viscosity solution and miscibility. Substantially pure carbon dioxide as previously produced for use in a secondary recovery operation is very costly, which cost renders the use of such previously produced carbon dioxide in secondary recovery entirely uneconomic.

Accordingly, it is the principal object of my invention to provide large quantities of substantially pure carbon dioxide at a cost such as to provide an economic secondary recovery process; one which is especially suitable for recovery of heavy crude oils.

Other objects of the invention will appear in the course of the description of the complete invention.

My invention will be better understood by reference to the attached drawings, which are block diagrams, as follows:

FIG. 1A shows another embodiment of the $CO_2$ invention wherein gaseous $CO_2$ and steam are used for the production of very heavy crude oil.

*Secondary recovery with gaseous carbon dioxide*

Figure 1:
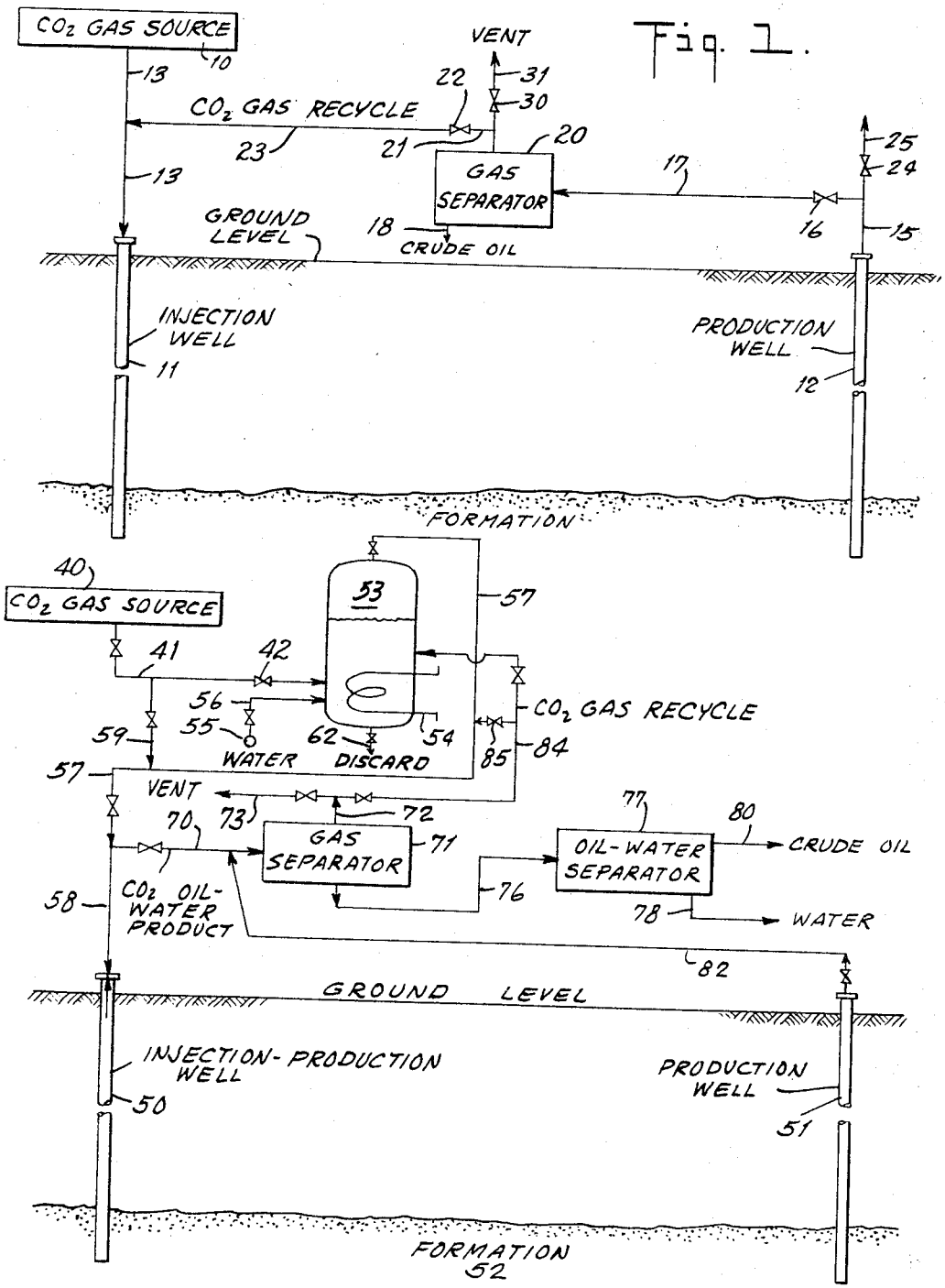
FIG. 1 shows the use of gaseous $CO_2$ in a secondary recovery operation, separate injection and production wells being indicated.

It has been discovered that crude oil present in an underground formation which requires "secondary recovery" techniques for the production theerof, can be recovered in high yield and at a high rate by injecting into the formation containing oil in the liquid state substantially pure gaseous carbon dioxide in an amount at least sufficient to saturate the formation oil and connate water at a pressure of not more than the formation overburden pressure with about 1800 p.s.i. as the maximum injection pressure required, and withdrawing from the formation a solution including carbon dioxide and crude oil; carbon dioxide is separated from the solution to recover the crude oil therein and the separated carbon dioxide is desirably recycled to the secondary recovery operation.

The carbon dioxide secondary recovery invention uses gaseous carbon dioxide which is substantially pure; i.e., the gaseous carbon dioxide is at least 85% $CO_2$. Preferably the carbon dioxide is essentially 100% purity.

The gaseous carbon dioxide is compressed to a pressure not exceeding the formation overburden pressure, with about 1800 p.s.i. as the maximum pressure; desirably the pressure is about 600–1000 p.s.i. (measured as partial pressure of carbon dioxide). The $CO_2$ is injected into the formation in the amount needed to saturate the formation oil and any connate water present; also to drive the solution of crude oil and carbon dioxide to a production well by $CO_2$ gas drive. In the case of a single injection-production well, lowering the pressure of the well bore will produce the oil-$CO_2$ solution by a blowdown effect.

The carbon dioxide secondary recovery method of this invention may be utilized with respect to any liquid, semi-solid, or solid petroleum hydrocarbon present in an underground formation (reservoir). These hydrocarbons will be referred to hereinafter as "crude oil" regardless of their particular characteristics such as the absence of gasoline range fractions or of dissolved gaseous hydrocarbons. The invention is especially suitable for the secondary recovery of heavy crude oils, i.e., oils having in general an API gravity of not more than about 25°. The very heavy crude oils having an API gravity below about 15° are particularly attractive for this method. The semi-solid or solid crude oils are commonly known as tars and are illustrated by hydrocarbons present in the Athabasca tar sands and in the Utah bituminous sands.

The gaseous carbon dioxide may be injected at ambient air temperature or at elevated temperature. When the crude oil to be recovered is a heavy crude oil, which is too viscous to be economically produced with gaseous $CO_2$ at formation temperature, the gaseous $CO_2$ is injected at a temperature above the softening point (ring and ball test ASTM D36–26) of the formation crude oil. In general this temperature will permit a more rapid diffusion of the $CO_2$ into the oil to form a less viscous solution which can be recovered by further gaseous carbon dioxide injection or by the "huff and puff" procedure. It is to be understood that the formation may need to be brought to a higher temperature such that the heated solution can be more readily produced by $CO_2$ drive. In general the lowest temperature needed to obtain a producible viscosity at the particular $CO_2$ pressure, will be used.

The gaseous carbon dioxide secondary recovery method may utilize any of the conventional techniques associated with inert or natural gas secondary recovery (pressure maintenance) operations. In the case of naturally liquid formation crude oil where direct communication between adjacent wells can be established, the gaseous $CO_2$ is introduced into the formation by way of one or more injection wells and the solution of the crude oil and carbon dioxide (and connate water) is withdrawn from the formation by way of one or more production wells, different from the input well.

The $CO_2$ secondary recovery invention is especially suitable for recovery of crude oil where communication between adjacent wells has not been established; even in situations where the wells in the field are considered to be in a primary production operation—e.g., on the pump at low production rates. The formations bearing very heavy crude oil, i.e., below about 15° API gravity, particularly the semi-solid petroleum hydrocarbons known as tars and bitumens, are especially benefited by the use of $CO_2$ in the "huff and puff" operation where the same well is cycled over an injection period and a production period.

In this procedure gaseous $CO_2$ is injected, at elevated temperature, usually in order to assist in bringing the formation oil to a readily producible viscosity in the form of the solution of $CO_2$ and oil, into the formation until the formation immediately adjacent the well bore has become saturated with $CO_2$—both the formation oil and connate water as well as voids—as evidenced by the attaining of a substantially constant pressure. Prior to saturation, the $CO_2$ pressure declines by seepage into the formation voids and solution into the oil and water.

At this time the well is operated as a producer. The $CO_2$ pressure in the formation drives a stream of oil-water-dissolved $CO_2$ and free $CO_2$ into the well bore and out of the well. The production period of the "huff and puff" cycle can be continued until the formation pressure drops to "zero," thereby returning the oil substantially to the dead state. However, it is preferred to leave some of the $CO_2$ in the formation to assist movement of the formation oil nearer to the well bore into the voids vacated by the produced oil. If permitted by overburden pressure, it is preferred to limit the pressure fall during the production period to a residual pressure of 400–600 p.s.i. This pressure variation tends to cause the $CO_2$ remaining in the formation to pulsate back and forth and will in time actuate the entire reservoir served by the well or break through to an adjacent well.

When the pressure during the production period has fallen to the preselected pressure, the injection period is recommenced.

Referring specifically to FIG. 1, 10 indicates a source of gaseous carbon dioxide, 11 an injection well, 12 a production well, 13 a line from the source 10 to the injection well for supplying gaseous carbon dioxide to the injection well. The gaseous $CO_2$ is injected in this embodiment at the formation tempertaure of about 80° F. and at a pressure of about 1200 p.s.i. About 1000 standard cubic feet of gaseous carbon dioxide are injected per 42-gallon barrel of crude oil produced in order to provide saturation, fill voids and drive the oil. In general $CO_2$ usage as measured by gas-oil ratio is between 1000–2000 s.c.f.b. produced, all of which may be recycled except that mechanically lost. The formation crude oil is about 20° API, and at these conditions the solution flows readily to the production well.

The solution of the crude oil and carbon dioxide produced at the production well flows through line 15 and through valve 16 and line 17 to separator 20. Separator 20 may be heated to vaporize substantially all the dissolved $CO_2$. At the separator crude oil is withdrawn by line 18 and the carbon dioxide is withdrawn in gaseous form through line 21, valve 22 and line 23 and returned to the feed line 13 and is thus recycled to the injection well. About one-half the $CO_2$ derived from source 10 is recovered; the remainder staying in the formation; dissolved in the oil; and losses. Except for losses, the formation $CO_2$ is recovered during the blow-down period.

It may be desirable to withdraw some solution through valve 24 and line 25 to storage or to a pipeline.

If all of the carbon dioxide in the solution is not needed for recycle purposes, the excess may be vented by way of valve 30 and line 31.

*Crude production with carbon dioxide and steam*

Steam injection is now being used to increase the production rate of heavy crude oil. These wells are in cyclic operation where the same well functions cyclically as the injection well as well as the production well. Steam is injected into the well for a period of 1–3 weeks. The steam heats the formation immediately around the well bore to a temperature of 300°–400° F. The steam condenses and the condensate water is forced into the formation around the well—thereby pushing oil out farther into the formation, a disadvantage—and heats the formation a further distance from the well. The well is shut in for a period in order to have the formation reach an equilibrium; then the well is produced. The condensate water and heated oil are produced; the initial oil production rate is generally 2–10 times the rate before steam injection. Gradually the rate decreases over 1–3 months until the rate is about that before steam injection.

This "huff and puff" steam treatment is effective only for a very short number of cycles, typically 3–5, dependent on the well. Also in many cases tight oil-water emulsions are formed which are resistant to conventional field separating techniques. The amount of steam injected is very large for each additional barrel of oil produced and increases for each cycle of treatment. Commonly 2–10 barrels of water, as steam, are required per barrel of additional oil production. Also, as was pointed out earlier, the depth of formation treated is limited because the maximum field steam pressure is on the order of 2000 p.s.i.

In some fields, the formation permits the condensate water to flow to a nearby well or wells, so that separate steam injection and oil-water production wells can be used in a hot water drive operation. This operation is more efficient than the "huff and puff" method; yet, it still requires large amounts of steam per barrel of oil produced because of the relatively high temperatures—300°–400° F.—required to bring very heavy crude oils to a viscosity and reservoir energy which will permit a reasonable flow rate of production.

It has become known that even in tar sands there are voids which permit inert gases to flow through the reservoir; these voids are of no value to steam drives because the steam condenses within the formation rather quickly, because the reservoir temperature is far below the boiling point of water.

I have discovered the disadvantages of steam injection for crude oil production are largely overcome when a mixture of steam and gaseous carbon dioxide is used as the injection medium. Desirably at least about one volume of gaseous carbon dioxide is injected for each volume of steam injected—both measured at the temperature and pressure of injection or about 2½ pounds of $CO_2$ per pound of steam. The exact proportion of $CO_2$/steam will be dependent on the type of crude oil in the formation, the final formation temperature, the bottom hole pressure and even the tendency of the oil-water product to emulsify. The partial pressure of the $CO_2$ will be lower than overburden pressure and not more than 1800 p.s.i., whichever is lower.

The $CO_2$-steam injection medium may be used either in the "huff and puff" operation or in the separate injection and production well operation. The presence of the $CO_2$ with steam in the "huff and puff" operation is of special value, the $CO_2$ adding much more energy to the reservoir than the use of steam alone. The $CO_2$/steam proportion is influenced by the type of operation.

The $CO_2$/steam injection method of the invention is especially useful in producing very heavy crude oil-bearing formations because the gaseous $CO_2$ seeps through the formation voids passing from an injection well to a producing well (future production at the start of the operation). The $CO_2$ seepage works on the crude oil gradually decreasing its effective viscosity and acting as a gas drive to increase the "voids" until truly effective amounts of $CO_2$ can pass. Finally hot water as well as $CO_2$ breaks through to the producing well, resulting in the desirable recovery operation with crude oil flowing from separate injection well to separate producing well in a formation which, based on knowledge before my invention, theoretically could only be produced by the "huff and puff" steam method.

The $CO_2$/steam production invention is described in connection with FIGURE 1A. Well 50 and well 51 are positioned in formation 52 which in this instance contains very heavy crude oil, e.g., 11° API, at a natural formation temperature of about 100° F. This crude oil has a viscosity of about 100 centipoises at 275° F., which gives a reasonable production rate. The formation overburden pressure is about 1000 p.s.i.

A saturated solution of $CO_2$ and this crude oil at 120° F. at about 700 p.s.i. has a viscosity of 100 centipoises. At the 900 p.s.i. injection pressure of this embodiment about 2 s.c.f. of essentially pure $CO_2$ are injected for each s.c.f. of steam.

In conventional steam recovery operations, it is necessary to operate the steam generators on good clean water. The $CO_2$/steam injection technique permits operation on "hard" or "brackish" water. Water is maintained at the desired temperature and pressure in a boiler; circulation through a heater affords the needed heat. Carbon dioxide is bubbled through the water in the boiler and becomes saturated with steam; the amount of $CO_2$ bubbled is determined by the $CO_2$/steam ratio needed in the injection medium. A blow-down maintains the solid content of the water in the vessel at the desired level.

Essentially pure $CO_2$ from source 40 is passed by way of valved line 41, including valve 42, to boiler 53, having a heater 54. Water from source 55 is passed by way of valved line 56 to boiler 53. The $CO_2$/steam injection medium is passed from boiler 53 by way of valved line 57 and line 58 and well 50 to formation 52. $CO_2$ may be by-passed from line 41 by way of valved line 59 to line 57. Here the injection medium is at about 430° F. Solids are periodically removed by blow-down through valved line 62.

In this embodiment well 50 is operated in the "huff and puff" technique as both the injection and the production well. The $CO_2$/steam medium is injected until the bottom hole pressure has stabilized at about 900 p.s.i., i.e., the oil and water in the immediate environs of the well bore are saturated with $CO_2$, but a portion of the $CO_2$ migrates well back from the well bore and adds reservoir energy to the formation. Then the flow of $CO_2$/steam is stopped.

The valves in line 57 are closed and the valve in line 70 is opened; well 50 now flows a stream of oil-$CO_2$-water as the $CO_2$ dissolved in the oil comes out of solution and drives the oil to the well bore.

The production flow is passed into gas separator 71. Carbon dioxide is withdrawn by line 72 and may be vented by valved line 73. Or this stream can be passed to another well which is in the injection portion of the production cycle.

Oil-water is withdrawn from separator 71 by way of line 76 and passed to oil-water separator 77. Water is withdrawn by line 78 and produced crude oil by line 80.

The well 50 can be produced until the pressure in the well bore has dropped to only a few pounds per square inch. However, this procedure results in the removal from solution of the $CO_2$ in the formation oil without producing all that oil. It is advantageous to maintain some $CO_2$ dissolved in the formation oil and also in the pores; therefore the production portion of the cycle is terminated at a preselected well-bore pressure, herein, 400 p.s.i. The valve in line 70 is closed and a new cycle is begun.

With each "huff and puff" cycle, the volume of formation surrounding well 50 which has been affected by the $CO_2$/steam recovery operation expands. Eventually there is a break-through to the nearest adjacent well 51. (It is to be understood both wells 50 and 51 can be operated as "huff and puff" wells until a break-through is obtained in the formation between the two wells.)

The formation 52 is then produced by using well 50 as an injection well and well 51 as a production well. Steam and $CO_2$ are injected at about 900 p.s.i., as in the "huff and puff" operation; pressure on the bore of well 51 is maintained at about 600 p.s.i. in order to keep the oil and water saturated with $CO_2$ and to afford a viscosity which can be readily produced at the temperature of fluids at well 51, on the order of 120° F., maintained by the hot water condensate from the steam/$CO_2$ injection medium.

In this separate well embodiment, $CO_2$/steam are injected continuously into well 50 and an oil-water-$CO_2$ stream is produced continuously from well 51. This production stream is passed by valved line 82 and line 70 to separator 71. The separated $CO_2$ gas is recycled to boiler 53 by way of valved line 84; some or all of the recycle $CO_2$ stream may be passed by way of valved line 85 to line 57.

In general between about 1000–2000 s.c.f. of $CO_2$ are needed, in the separate injection and production well operation, per barrel of oil produced. It is necessary to maintain in the formation not only enough $CO_2$ to saturate the oil and water remaining in the formation but also to fill the voids left by the oil and water produced. Also there are inevitable losses. Make-up $CO_2$ is derived from source 40.

Combination methods

I have discovered that simultaneous economical secondary recovery of crude oil from an underground formation and production of hydrogen is possible by converting a hydrocarbon to hydrogen in an operation which produces substantially pure carbon dioxide; the injection of said carbon dioxide into an underground formation containing crude oil in the liquid state; and the withdrawal from said formation of a solution including $CO_2$ and crude oil.

The gaseous carbon dioxide is injected under the preferred conditions described in the preceding sections on "Secondary Recovery with Gaseous Carbon Dioxide" and "Crude Production with Carbon Dioxide and Steam."

Embodiments of this combination method invention when the hydrogen is consumed in ammonia production and in the upgrading of crude oil follow:

Simultaneous production of ammonia and secondary recovery of crude oil

My method for the simultaneous production of ammonia and for secondary recovery of crude oil from an underground formation comprises: making hydrogen gas from a hydrocarbon feed under conditions to also make substantially pure $CO_2$; reacting said hydrogen gas with nitrogen to obtain ammonia; injecting said $CO_2$ into an underground crude oil formation; and withdrawing from said formation a solution of $CO_2$ and crude oil.

Figure 2:
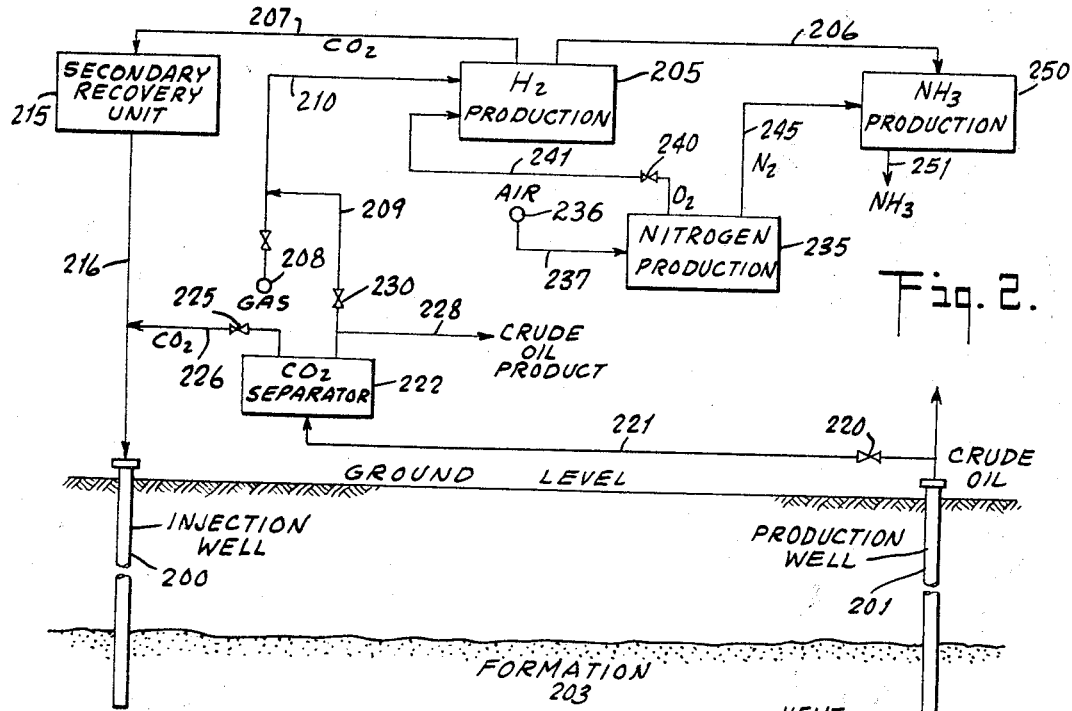
FIG. 2 is a diagram of a combination method for simultaneously making ammonia and $CO_2$ for injection into a heavy oil bearing formation.

Referring specifically to FIG. 2 of the drawings, 200 indicates an injection well and 201 a production well connected to a formation 203 where secondary recovery is desired.

The hydrogen production operation is indicated by the block 205. Any of the conventional procedures for hydrogen production may be used. Illustrative are partial oxidation and steam reforming processes, which processes are described briefly in Hydrocarbon Processing and Petroleum Refiner, for Sept. 1964, pp. 230 and 231. The partial oxidation process is utilized when the hydrocarbon feed to the process is a liquid oil. The steam reforming process is used when the hydrocarbon feed is a gas.

The process produces not only hydrogen which flows through the line 206, but also carbon dioxide which flows through line 207. Normally this carbon dioxide is essentially 100% purity. The hydrocarbon feed to the hydrogen production unit may be methane-rich gas, for example natural gas, from source 208, or it may be formation crude oil from line 209. The hydrocarbon fuel is passed by way of line 210 into hydrogen production unit 205.

The carbon dioxide from line 207 flows into secondary recovery unit 215 and is supplied through line 216 to the injection well 200. It is preferred to inject gaseous $CO_2$ as described above. The $CO_2$/steam technique may be used. From the production well 201 a solution of crude oil and carbon dioxide flows through valve 220, line 221 to a separator 222, from which carbon dioxide gas is drawn through valve 225 and line 226 for recycle with the gaseous carbon dioxide supply stream through line 216.

The crude oil substantially free from carbon dioxide is withdrawn from separator 222 through line 228. A portion of the crude oil may be passed from valve 230 and line 209 to provide hydrocarbon feed for hydrogen production.

Although it is not essential to produce nitrogen for ammonia production by fractionation of air, it is so carried out in this embodiment of the invention. Nitrogen is produced in nitrogen production unit 235 from air introduced from source 236 and line 237. The oxygen product is withdrawn by valve 240 and line 241 and sent to the hydrogen production unit 205.

Nitrogen is withdrawn by line 245 and sent to ammonia production unit 250. The nitrogen from line 245 and the hydrogen from line 206 are reacted by any conventional ammonia production process to produce ammonia, which is withdrawn by way of line 251.

In an illustrative operation a 300 ton/day ammonia plant is located near an oil field covering approximately 2500 acres. The "contained reservoir" formation bears oil of about 15° API having a viscosity of 1700 centipoise at reservoir temperature of 80° F. The formation is at 2000 feet depth and is about 25 feet thick—roughly: porosity, 30%; permeability 500 millidarcies; oil saturation, 60% (1400 bbls./acre foot); water saturation, 40%; essentially no solution gaseous hydrocarbon; the formation overburden pressure, 950 p.s.i. The oil viscosity needs to be decreased to 200 centipoise in order to be producible by a vigorous $CO_2$ drive. The field will initially be produced by the "huff and puff" technique until adjacent wells have been brought into communication.

The ammonia plant makes at least 6 million s.c.f. of 98–99% $CO_2$ at a pressure of about atmospheric. The gaseous $CO_2$ is injected into the formation until a bottom hole pressure of about 800 p.s.i. is established. The wells are then produced until the bottom hole pressure decreases to 600 p.s.i. At this point injection once again begins and the cycle is completed. The cyclic "huff and puff" operation is continued until break-through occurs and direct $CO_2$ gas drive can be carried out.

The $CO_2$/oil ratio needed to produce the oil is about 2000 s.c.f./bbl. At 800 p.s.i. the oil will absorb about 300 s.c.f./bbl. of $CO_2$; at 600 p.s.i. the oil will absorb about 200 s.c.f./bbl. of $CO_2$. The gas from producing wells during the "huff and puff" operation is cycled to wells on the injection cycle.

Some $CO_2$ will be lost by solution in the product crude oil; some by losses in handling. However, the ammonia plant permits a net gain of $CO_2$ to the formation for filling voids created by production and to saturate oil and connate water therein. Essentially all of the $CO_2$ available becomes reservoir gas and the vent $CO_2$ is available for recycle to the formation for producing more oil.

Over a period of years, it is estimated about 50% of the oil will have been recovered; the pore volume in the formation will have been washed about 2.3 times with $CO_2$ in the 600–800 p.s.i. range.

The reservoir is filled with $CO_2$ gas, as such, and in solution in the oil and connate water. By blowing down the reservoir to a low pressure, about 10% of the oil in the formation can be expelled along with the escaping $CO_2$.

After the wells have come into direct communication, the reservoir can be produced by a direct drive of gaseous $CO_2$ at 800 p.s.i.; the 300 ton ammonia plant produces sufficient $CO_2$ plus the recycle to saturate the formation crude oil and connate water and to drive oil and water to the producing wells.

Over a period of years, it is estimated the $CO_2$ secondary recovery operation will produce about 9000 bbls./day of crude oil and 6000 bbls./day of water.

*Simultaneous secondary recovery of heavy crude oil and upgrading thereof*

My method for simultaneous production and upgrading of heavy crude oil obtained by secondary recovery from an underground formation comprises: making hydrogen gas from a hydrocarbon feed under conditions to also make substantially pure $CO_2$; injecting said $CO_2$ into an underground heavy crude oil formation; withdrawing from said formation a solution of $CO_2$ and heavy crude oil; separating $CO_2$ from said heavy crude oil; and treating said recovered heavy crude oil with said hydrogen gas to upgrade said heavy crude oil.

Figure 3:
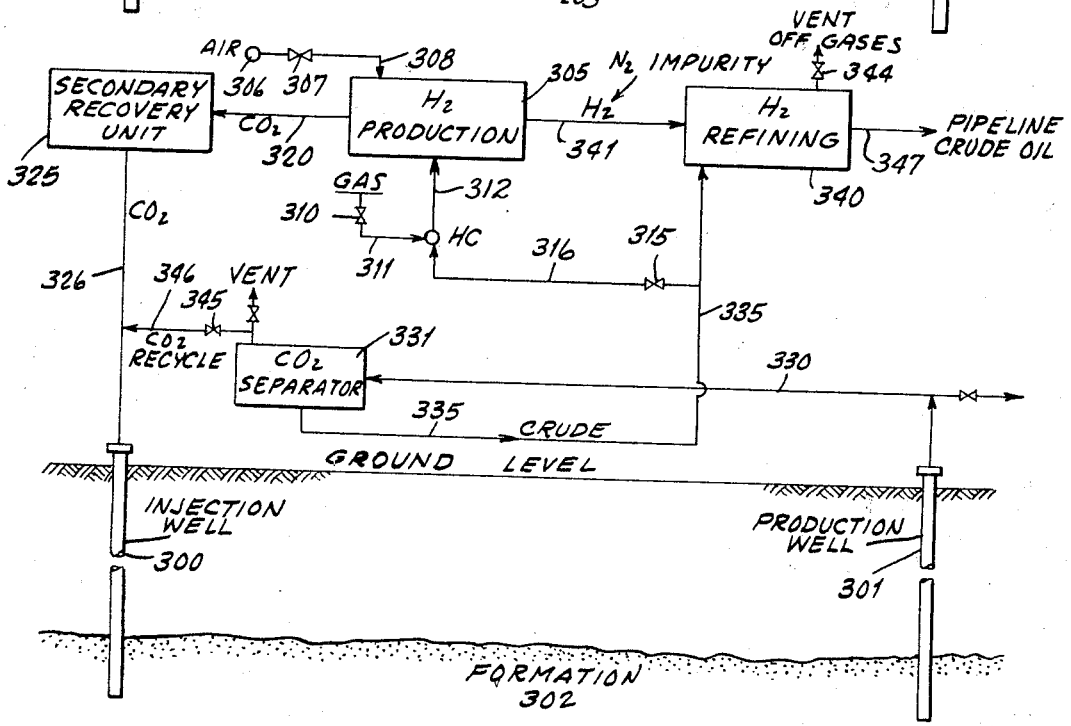
FIG. 3 illustrates a combination method for simultaneously making upgraded crude by hydrogen treating and producing free $CO_2$ for injection into an oil bearing formation.

Referring specifically to FIG. 3, injection well 300 and production well 301 are positioned in a formation 302 containing heavy crude oil.

A hydrogen production unit 305 corresponds to hydrogen production unit 205 of FIG. 2. In this embodiment hydrogen production is preferably a partial oxidation process utilizing oxygen from source 306 through valve 307 and line 308. Hydrocarbon fuel for the hydrogen production unit may be natural gas from valve 310 and line 311 through line 312 to hydrogen production unit 305. In this embodiment formation crude oil is supplied through valve 315 and line 316 and thence through line 312 to the hydrogen production unit.

Carbon dioxide from the hydrogen production unit 305 is supplied through line 320 to secondary recovery unit 325, thence through line 326 to injection well 300. Preferably gaseous $CO_2$ is injected as described above. Also the $CO_2$-steam technique may be used. The solution of crude oil and carbon dioxide from production well 301 is supplied through line 330 to a separator 331 from which crude oil is drawn through line 335 and continues to supply a hydrogen refining unit 340. A part of the crude oil from this line 335 is connected through valve 315, as above set forth. The gaseous carbon dioxide from the separator 331, as in FIG. 2, flows through valve 345 and line 346 to the primary carbon dioxide supply line 326.

The formation crude oil from line 335 is upgraded in hydrogen refining unit 340. The term "upgrading" is to be understood as including improvements in quality such as sulphur removal, nitrogen removal and the like and also changes in the chemical nature of the product as by hydrocracking to decrease viscosity of the crude or even to crack the crude to produce a more or less high gravity crude oil containing a large amount of gasoline and other distillate materials. Alternatively the hydrogen may be used to upgrade distillates produced conventionally from the crude oil—or from other crude oils.

In the case of the very heavy crude oils viscosity decrease is very desirable as well as the simultaneous decrease in sulphur and nitrogen content. Typical hydrogen viscosity breaking operations are the H-oil process and the HDS process briefly described in Hydrocarbon Processing and Petroleum Refiner, Sept. 1964, at pages 145 and 189, respectively. Hydrogen is introduced into the hydrogen refining unit 340 through line 341 and accomplishes the desired degree of upgrading of the crude oil introduced through line 335. Off-gases are vented through valved line 344. In this embodiment the upgraded crude oil is suitable for sale as a high quality wide-boiling range crude, herein designated as pipeline light crude; the pipeline light crude product is withdrawn from hydrogen refining unit 340 through line 347.

*Simultaneous production of ammonia, heavy crude oil by secondary recovery and upgraded heavy crude oil*

My method for the simultaneous production of ammonia, of heavy crude oil by secondary recovery, and of upgraded heavy crude oil comprises: making hydrogen gas from a hydrocarbon feed under conditions to also make substantially pure $CO_2$; reacting a portion of said hydrogen with nitrogen to obtain ammonia; injecting said $CO_2$ into an underground formation containing heavy crude oil; withdrawing from said formation a solution of $CO_2$ and heavy crude oil; separating $CO_2$ from said heavy crude oil; and treating said recovered heavy crude oil with a portion of said hydrogen to upgrade said heavy crude oil.

Figure 4:
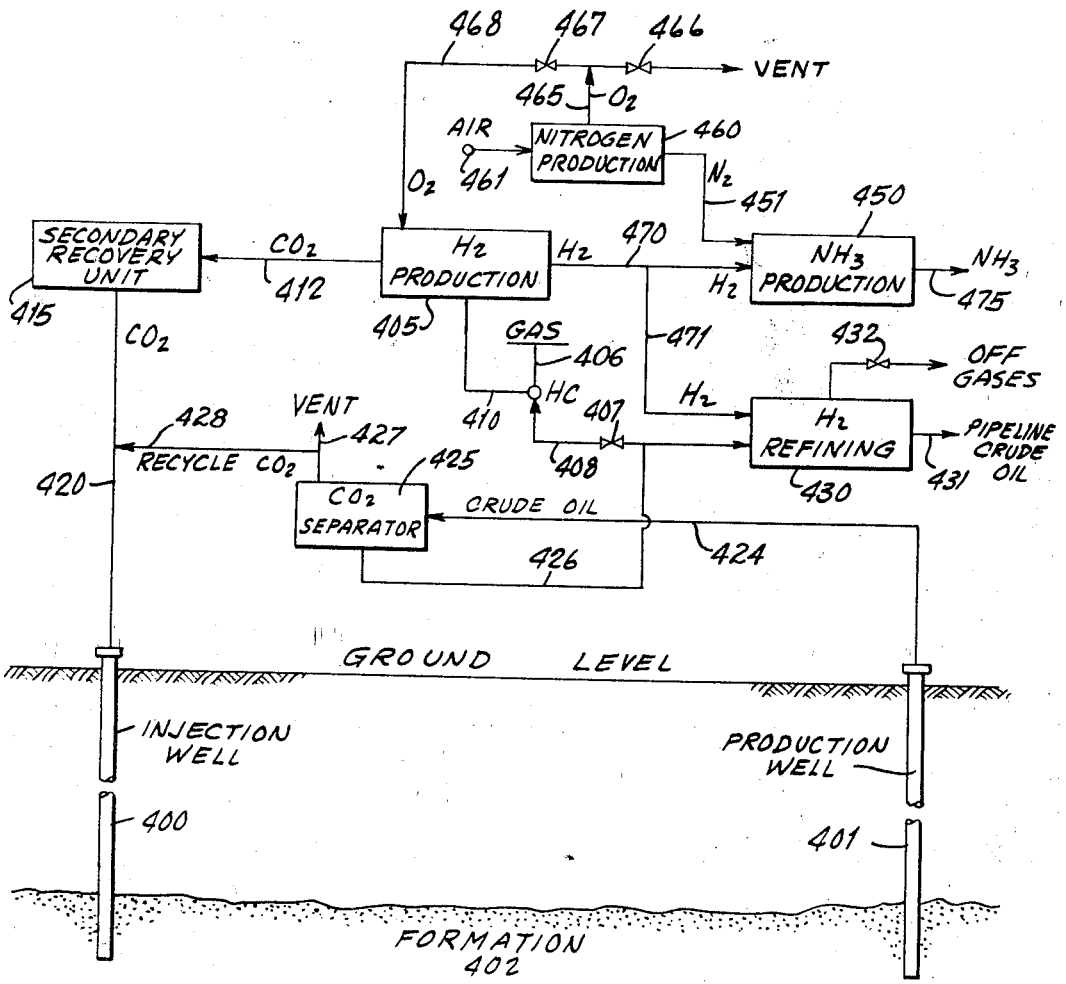
FIG. 4 illustrates a combination method for the simultaneous production of ammonia, the upgrading of crude oil and gaseous carbon dioxide for injection into a heavy crude oil bearing formation.

Having special reference to FIG. 4, 400 designates an injection well and 401 a production well in a formation 402 where heavy crude oil is present. The process involves a hydrogen production unit 405, such as described in FIG. 2, which is supplied with hydrocarbon fuel, either natural gas through line 406 or crude oil from the formation through valve 407 and line 408. The hydrocarbon material then enters the hydrogen production unit 405 through line 410.

The carbon dioxide from the hydrogen production unit 405 is supplied through line 412 to secondary recovery unit 415. Thence the carbon dioxide is supplied through line 420 to input well 400; the recovery technique may be any one described above. A solution of heavy crude oil and carbon dioxide is produced from production well 401 and, as already described in FIG. 2, the solution goes through line 424 to separator 425, the crude oil being taken out through line 426, which is connected to a hydrogen refining unit 430. A portion of the crude oil from line 426 passes through valve 407, line 408 and line 410 to the hydrogen production unit when this crude oil is the source of hydrocarbon feed. Some or all of the carbon dioxide separated from the solution at separator 425 may be vented through line 427 or recycled by lines 428 and 420 to input well 400.

An ammonia production unit 450 is supplied with nitrogen through line 451 from nitrogen production unit 460. This unit is supplied with air through line 461, and oxygen is discharged from the nitrogen production unit 460 through line 465. This oxygen may be vented through valve 466 or supplied through valve 467 and line 468 to the hydrogen production unit 405 which is here operated as a partial oxidation process. From the hydrogen refining unit 430 pipeline crude oil is produced and discharged through line 431. The off-gases from the hydrogen refining unit are discharged through valved line 432. From the hydrogen production unit 405 hydrogen is supplied through line 470 to the ammonia production unit 450, and a portion of the hydrogen is supplied through line 471 to the hydrogen refining unit 430. Ammonia is withdrawn from the ammonia production unit 450 through line 475.

Thus having described the invention, what I claim is:

1. A combination method comprising:
    conversion of a hydrocarbon feed to hydrogen and substantially pure gaseous carbon dioxide;
    injecting said carbon dioxide into an underground formation containing crude oil at a pressure of not more than the formation overburden pressure with about 1800 p.s.i. as the maximum partial pressure of said carbon dioxide injected into said formation and in an amount sufficient to saturate said crude oil at the partial pressures of said carbon dioxide penetrating through said formation and thereby form a solution of said carbon dioxide in said crude oil, said solution having a reduced viscosity relative to the viscosity of said crude oil;
    withdrawing from said formation said solution; and
    separating said carbon dioxide from the withdrawn solution and thereby recovering said crude oil in said withdrawn solution.

2. The method of claim 1 wherein said hydrocarbon feed is a natural gas.

3. The method of claim 1 wherein said hydrocarbon feed is crude oil from said formation.

4. The method of claim 1 wherein said crude oil has an API gravity of not more than about 25° and said carbon dioxide is heated prior to injection into said formation.

5. The method of claim 1 wherein said carbon dioxide separated from said withdrawn solution is recycled by injection into said formation.

6. The method of claim 5 wherein said hydrocarbon feed is crude oil recovered from said formation.

7. A combination method comprising:
    producing substantially pure gaseous carbon dioxide;
    bubbling said carbon dioxide at a preselected injection pressure through heated water;
    injecting the resulting heated carbon dioxide saturated with steam at said preselected injection pressure into an underground formation containing crude oil in an amount sufficient to saturate said crude oil at the partial pressures of said carbon dioxide penetrating through said formation and thereby form a heated solution of said carbon dioxide in said crude oil having a temperature not exceeding about 400° F., said preselected injection pressure being not more than the formation overburden pressure with about 1800 p.s.i. as the maximum partial pressure of said carbon dioxide injected into said formation and said heated solution having a reduced viscosity relative to the viscosity of said crude oil;
    withdrawing from said formation said heated solution; and
    separating said carbon dioxide from the withdrawn solution and thereby recovering said crude oil in said withdrawn solution.

8. The method of claim 7 wherein at least about one volume of said carbon dioxide is injected for each volume of steam injected into said formation.

9. The method of claim 7 wherein said carbon dioxide separated from said withdrawn solution is recycled by injection into said formation.

10. The method of claim 7 wherein said carbon dioxide is produced in processing a hydrocarbon feed.

References Cited

UNITED STATES PATENTS

| 2,623,596 | 12/1952 | Whorton et al. | 166—7 |
|---|---|---|---|
| 2,729,291 | 1/1956 | Haverfield | 166—7 |
| 3,065,790 | 11/1962 | Holm | 166—9 |
| 3,075,918 | 1/1963 | Holm | 166—9 X |
| 3,193,006 | 7/1965 | Lewis | 166—7 |
| 3,228,467 | 1/1966 | Schlinger et al. | 166—7 |
| 3,240,271 | 3/1966 | Ortloff | 166—9 |
| 3,266,569 | 8/1966 | Sterrett | 166—2 |
| 3,310,109 | 3/1967 | Marx et al. | 166—7 |
| 3,333,637 | 8/1967 | Prats | 166—2 X |

FOREIGN PATENTS 511,768   8/1939   Great Britain.

STEPHEN J. NOVOSAD, *Primary Examiner.*

U.S. Cl. X.R.

166—267, 272